United States Patent Office 2,813,122
Patented Nov. 12, 1957

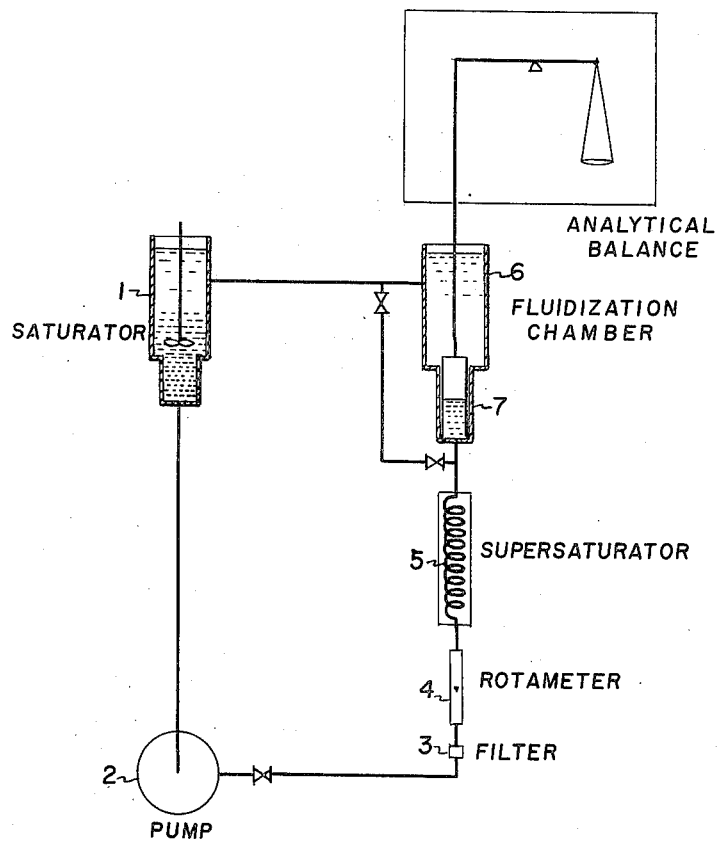

2,813,122

ADIPIC ACID CRYSTALLIZATION

William B. Clark and Robert E. Gee, Wilmington, Del., assignors to E. I. du Pont de Nemours and Company, Wilmington, Del., a corporation of Delaware Application August 27, 1953, Serial No. 376,849

9 Claims. (Cl. 260—537)

This invention relates to a process for the crystallization of adipic acid and more particularly to a process of carrying out that crystallization of adipic acid at a high rate from the products obtained by oxidation of cyclic hydrocarbons or mixtures of the cyclic hydrocarbons and other hydrocarbons. This application is a continuation-in-part of application S. N. 278,066, filed March 22, 1952, now abandoned.

The petitioners' process relates more particularly to the economic recovery of adipic acid in substantially pure form by crystallization from aqueous solutions of the products obtained from these oxidations. Adipic acid is produced commercially from cyclohexane, for instance, by successive oxidations. The cyclohexane may be treated with air according to the Loder U. S. Patent 2,223,493, issued December 3, 1940, so as to convert a portion of the cyclohexane to partially oxidized intermediates. The partially oxidized intermediates are usually first separated from unoxidized hydrocarbon and may then, without further purification, be oxidized to adipic acid in high yield by treatment with nitric acid as in the Hamblet et al. U. S. Patent 2,439,513, issued April 13, 1948. Alternatively, the partially oxidized intermediates may be fractionated and selected portions subjected to oxidation by nitric acid or air to form the adipic acid.

All of these large scale commercial processes for the manufacture of adipic acid by oxidation of cyclic hydrocarbons have certain features in common. In each case, irrespective of the purification steps enroute, the crude reaction product from the final air or nitric acid oxidation contains by-product organic acids; such monobasic acids as acetic, valeric, caproic, butyric, cyclohexanecarboxylic, isovaleric, and propionic, and such polybasic acids as succinic, glutaric and oxalic. In each case the crude product of the oxidation comprises a solution of the adipic and by-product acids in some solvent, and recovery of the adipic acid is accomplished by crystallization and subsequent recrystallization from an aqueous medium. In all of these crystallizations various mother liquor and filter cake wash streams containing adipic and by-product acids are recycled to the crystallization steps. Heretofore, it has been customary to restrict the portion and composition of the recycle streams to maintain in the crystallization environment concentrations of by-product acids as low as possible in an effort to obtain a final product of high purity.

An object of the present invention is to provide an improved process for the crystallization of adipic acid. A further object is to provide a commercially attractive process for crystallizing adipic acid from aqueous solutions containing other acids. Yet another object is to crystallize adipic acid in the form of large crystals by providing conditions for increasing the rate of crystal growth and minimizing the rate of nucleation of adipic acid from the products of air and/or nitric acid oxidation of cyclic hydrocarbons and mixtures of cyclic hydrocarbons with other hydrocarbons. Other objects and advantages of the invention will appear hereinafter.

In the various crystallizations of adipic acid from aqueous media there is a pronounced tendency to produce small crystals. When saturated solutions are cooled appreciably, the rate of formation of new crystal nuclei is high in relation to the rate of growth of existing crystals. The high rate of nucleation is even more apparent when nitric acid is present in the aqueous medium. As a result, the adipic acid is frequently obtained in the form of a "milky" dispersion. The capacity of filtration equipment separating the adipic acid from mother liquor is greatly reduced when the crystal size is small. In addition, the small crystals retain greater portions of mother liquor, washing procedures become less effective, and the purity of the final product is impaired.

In accord with the invention it has been found that the presence of other organic acids in an aqueous adipic acid crystallization environment reduces the rate of formation of new crystal nuclei. These organic acids are incorporated in concentration below their solubility limit. As a result, adipic acid can be separated in the form of large crystals from solutions that would otherwise give only finely divided particles. Adipic acid of high purity can thus be obtained because of improved filtration and washing characteristics.

Both the monobasic and dibasic by-product organic acids have been used with success to suppress nucleation. The monobasic acids are in general more effective than the dibasic acids, and smaller amounts are required. However, the monobasic acids are adsorbed in trace quantities on the surface of the adipic acid crystals, thus requiring for some end uses further purification such as prolonged high temperature drying. The dibasic acids show less tendency for adsorption and the normal water washing techniques produce adipic acid crystals of high purity.

In the commercial processes mentioned above, there are several ways of introducing the organic acids in sufficient quantity to suppress nucleation to the desired degree. They can, of course, be introduced as such into the crystallizer feed. As an alternative, hydrocarbons that produce the desired acids in high yield can be introduced into the initial air oxidation step. However, since effective organic acids are produced even from cyclohexane in appreciable quantities, we prefer to build-up the proper concentration of by-product acids in the crystallization environment by recycling to the process, streams in which these by-products are concentrated.

While the by-product organic acids are remarkably effective in suppressing the nucleation of adipic acid crystals, the rate of crystal growth is also decreased appreciably by their presence. Thus, under certain conditions it is quite possible to cool such solutions as much as 10° C. below the true adipic acid crystallizing point for several hours with little apparent effect. No nucleation is evident and supersaturation is released only very slowly on existing crystal surfaces. It is obvious that additional conditions must be stipulated for a commercially useful crystallization process.

In further accord with this invention, it has been found highly important to conduct adipic acid crystallizations at elevated temperatures. As a result of extensive research it has been determined that a large positive temperature co-effcient exists for the rate of crystal growth of adipic acid from aqueous solutions. Comparing the crystallization of solutions of comparable supersaturation (weight of crystallizable adipic acid/volume of solution), quantitative results show that increasing the temperature from 25° C. to 47° C. increases the crystal growth rate as much as ten-fold. Practical process considerations of handling the saturated solutions containing high concentrations of adipic acid limit the upper crystallizer temperature to about 70° C.

In the commercial processes we have discussed previously, higher crystallization temperatures can be used conveniently without sacrificing recovery of adipic acid due to greater solubility in the higher temperature mother liquor. After crystallization and filtration steps, the major portion of mother liquor is recycled to the process, taking only sufficient purge to maintain the by-product dibasic acid concentration below the point where they would crystallize out with the adipic acid. When the temperature of crystallization is raised, higher concentrations of by-product dibasic acids can be tolerated without such co-crystallization. The portion of mother liquor that is purged can thus be reduced, thereby compensating for the greater solubility of adipic acid at the higher temperature. In all cases the purge stream is processed further to recover additional adipic acid.

It has been found that excellent crystallizer operation, e. g., high crystal growth rate, and low crystal formation (nucleation) rate or high solution stability, occur at temperatures between 40° C. to 70° C. with as little as 0.1% up to 0.5% or more, based on the total weight of the solution, of a by-product monobasic acid such as caproic acid, when crystallizing from ordinary aqueous solutions with somewhat higher percentages, about 3%, for the monobasic acid having less than 8 carbon atoms. Approximately 1% of a by-product dibasic acid, based on the total weight of the solution, such as succinic acid gives comparable results. However, when nitric acid is a component of the crystallization environment, the rate of nucleation is increased and larger amounts of by-product acid are required to stabilize the supercooled solution. For instance, an aqueous adipic acid solution containing 40% nitric acid requires about 8% succinic acid for good crystallizer performance at 40° C. Up to 18% of the dibasic acids may, however, be used, the supersaturation of adipic acid in nitric acid solutions of from 25% to 45% being between 2° C. and about 5° C. for high solution stability at temperatures between 40° C. and 70° C.

The invention will be more readily understood and the terminology employed more clearly appreciated by reference to the drawing which diagrammatically illustrates the method used for determining the optimum conditions for optimum rates of growth. Although the crystallization was studied in a continuous system, the principles are equally applicable to batch crystallizations.

In vessel 1 a solution is saturated with adipic acid. From the saturator vessel 1 the saturated solution is forced by pump 2 through filter 3 and rotameter 4 into the supersaturator 5 wherein the temperature of the solution is lowered to give the desired degree of supersaturation. From vessel 5 the supersaturated solution flows through the fluidization chamber 6 containing in the bottom portion thereof a suitable porous seed basket 7 in which the crystals are collected. From the top of fluidization chamber 6 the mother liquor is returned to the saturator 1. The yield of crystals collected in seed basket 7 can be weighed from time to time to determine the rate of crystallization.

In determining the rate of crystal growth a fluid concentrate was prepared by saturating water with 100-mesh (U. S. standard) adipic acid at carefully controlled temperature for from 1 to 1½ hours. This concentrate was placed in the saturator 1 while a carefully weighed quantity of 10–20 mesh adipic acid seed crystals, with known surface area characteristics, were placed in the seed basket and the loaded basket inserted in the crystallization chamber 6. The saturated solution was then forced by pump 2 through filter 3, rotameter 4 and supersaturator 5 in which the temperature of the saturated liquor was lowered to the desired supersaturation temperature. The flow rate, liquor temperature in the fluidization chamber and liquor temperature in the saturator were taken and after prescribed periods of operation the seed basket of crystals was weighed so that a semi-continuous record of weight gain versus time was obtained and the crystallization rate calculated.

To demonstrate the effect of by-product acids on suppressing the nucleation rate of supersaturated aqueous adipic acid solutions, a representative group of runs made in the experimental laboratory crystallizer described above are tabulated in Table I. Inspection of these data indicates that bulk nucleation occurs abruptly above certain critical values of the supersaturation, and that these "critical" supersaturation values are influenced markedly by by-product monobasic or dibasic acid concentration. For example, increasing the absolute supersaturation from 0.349 lbs./ft.$^3$ (run 1A) to 0.437 lbs./ft.$^3$ (run 1B) resulted in bulk nucleation, causing the laboratory unit to plug and become inoperable. In runs 5A and 5B, increasing supersaturation from 0.365 lbs./ft.$^3$ to 0.391 lbs./ft.$^3$ caused uncontrolled nucleation to occur. Runs 6, 7, 8, and 9 also illustrate the transition beyond the "critical" supersaturation point where nucleation occurs. The effect of by-product organic acids on the solution stability can be seen by comparing runs 1 and 2, or runs 8, 9 and 10. In the latter three runs, uncontrolled nucleation did not occur until supersaturations of 0.966, 1.080, and over 1.24 lbs./ft.$^3$ were reached in solutions containing 2, 8 and 12% by-product dibasic acids, respectively. The effect of small concentrations of monobasic acids on stability can be seen by comparing runs 2 and 6, where nucleation occurred without added caproic acid at less than 0.239 lbs./ft.$^3$ supersaturation (run 2), but with 0.037% caproic acid added, supersaturations of 0.358 lbs./ft.$^3$ could be tolerated without instability.

It is further shown from Table I that increasing amounts of by-product organic acids are necessary to stabilize the solutions when the nitric acid strength is increased. In runs 1, 2, and 3 the nitric acid strength was 0, 10, and 40% and the solutions became unstable at supersaturations of 0.349, 0.239, and 0.113 lbs./ft.$^3$, respectively. Runs 5, 6 and 7 also illustrate this point.

TABLE I

*Adipic acid crystallization from aqueous solutions (38–42° C.)*

| Run No. | Supersaturation (lbs./ft.$^3$ solution) | Conditions | Remarks |
| --- | --- | --- | --- |
| 1A | 0.349 | 0% HNO$_3$, 0% By-Product Acids. | Stable operation of unit. |
| 1B | 0.437 | ...do... | Bulk nucleation—Unit plugged. |
| 2 | 0.239 | 10% HNO$_3$, 0% By-Product Acids. | No meaningful rate data could be obtained. Unstable. |
| 3 | 0.113 | 40% HNO$_3$, 0% By-Product Acids. | Copius bulk nucleation. |
| 4 | 0.590 | 0% HNO$_3$, 5% Succinic Acid. | Good run. |
| 5A | 0.365 | 5% HNO$_3$, 0.037% Caproic Acid. | Do. |
| 5B | 0.391 | ...do... | Nucleation occurred. |
| 6A | 0.358 | 10% HNO$_3$, 0.037% Caproic Acid. | Good run. |
| 6B | 0.371 | ...do... | Nucleation. |
| 7A | 0.154 | 47% HNO$_3$, 0.037% Caproic Acid. | Good run. |
| 7B | 0.294 | ...do... | No data could be obtained. |
| 8A | 0.754 | 47% HNO$_3$, 1.3% Glutaric and 0.7% Succinic. | Good data. |
| 8B | 0.966 | ...do... | Unit plugged—Nucleation. |
| 9A | 0.897 | 47% HNO$_3$, 5.2% Glutaric and 2.8% Succinic. | Good data. |
| 9B | 1.080 | ...do... | Heavy "frosting" (nucleation) on equipment walls. |
| 10 | 1.24 | 47% HNO$_3$, 7.7% Glutaric and 4.3% Succinic. | Good run. |

The further processes of the examples which follow in

Table II and in which parts are by weight unless otherwise stated, were carried out in the manner described above. In Examples 1 through 8 the saturated solution from which the adipic acid was crystallized was prepared by saturating a nitric acid mother liquor (NML) with adipic acid and in Example 9 through 12 by saturating a water mother liquor (WML). The NML liquor was the mother liquor left after crystallization of the first crop of adipic acid crystals from a product obtained from the air and nitric acid oxidation of cyclohexane as described in the Hamblet et al. U. S. Patent 2,439,513, after stripping off the volatile matter. The WML was the mother liquor left after dissolving in water the first crop of adipic acid crystals referred to in the last sentence and crystallizing adipic acid from that water solution.

The value of K was determined in accord with the equation:

$$\frac{dw}{d\theta} = KAS$$

containing from 2 to 8 carbon atoms. Examples of the monobasic acids are acetic, and the normal and branched chain propionic, butyric, valeric, caproic, heptoic and caprylic acids. The dibasic acids that may be used include, for example, oxalic, malonic, succinic, glutaric, pimelic and suberic acids.

The suppression of nucleation can be effected by the use of monobasic or dibasic acids or both. If a mixture is used the amounts required for optimum results are based on the relative effectivenes of the acids used as has been indicated above in the description of the amounts of the separate acids, the monobasic being considerably more effective than the dibasic acid.

The process of the invention is more startingly effective in large scale crystallization than it is in the crystallizations described in the examples. In commercial uses in which millions of pounds of adipic acid are crystallized per year, an over-all increase in capacity of as much as 3,000 pounds per hour has been realized when operating in accord with the invention.

TABLE II

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Material used | (1) | (1) | (1) | (1) | (1) | (1) | (1) | (1) | (1) | (1) | (1) | (1) |
| Weight charged, dry, gms | 4.00 | 5.00 | 3.00 | 3.00 | 3.00 | 5.00 | 5.00 | 5.00 | 3.00 | 3.00 | 3.00 | 3.00 |
| Av. Growth rate, gms./hr | 0.90 | 2.4 | 1.0 | 1.2 | 1.22 | 0.33 | 0.71 | 2.64 | 0.425 | 0.12 | 0.24 | 0.925 |
| Area: | | | | | | | | | | | | |
| Bed height, dry, cm | 2.5 | 2.5 | 1.5 | 1.5 | 1.5 | 2.5 | 2.5 | 2.5 | 1.5 | 1.5 | 1.5 | 1.5 |
| Bed volume, cms | 5.7 | 7.1 | 4.25 | 4.25 | 4.25 | 7.1 | 7.1 | 7.1 | 4.25 | 4.25 | 4.25 | 4.25 |
| Crystal volume, cm$^3$ | 2.94 | 3.7 | 2.2 | 2.2 | 2.2 | 3.7 | 3.7 | 3.7 | 2.2 | 2.2 | 2.2 | 2.2 |
| E | 0.48 | 0.475 | 0.48 | 0.48 | 0.48 | 0.48 | 0.48 | 0.48 | 0.48 | 0.48 | 0.48 | 0.48 |
| $a=$(ft.$^{-1}$) | 1,450 | 1,450 | 1,450 | 1,450 | 1,450 | 1,450 | 1,450 | 1,450 | 1,450 | 1,450 | 1,450 | 1,450 |
| $A=$(ft.$^{-2}$) | 0.29 | 0.36 | 0.218 | 0.218 | 0.218 | 0.36 | 0.36 | 0.36 | 0.218 | 0.218 | 0.218 | 0.218 |
| Feed: | | | | | | | | | | | | |
| Percent HNO$_3$ | 40 | 42 | 42 | 42 | 42 | 38 | | 38 | 2.2 | 2.2 | 2.2 | 2.2 |
| DBA | | | | | | Glutaric and Succinic | | | | | | |
| Percent DBA (adipic free) | 12 | 8 | 8 | 8 | 8 | 8 | | 8 | (0.68 glutaric and 1.35 succinic) | | | |
| MBA | | | acetic | valeric | caproic | all | all | all | all | all | all | all |
| MBA, conc., percent by wt | 0 | 0 | 1.25 | 0.10 | 0.035 | 0.245 | 0.245 | 0.245 | 0.0085 | 0.0085 | 0.0085 | 0.0085 |
| $\rho_s$ gm./cc | 1.26 | 1.26 | 1.26 | 1.26 | 1.26 | 1.252 | 1.23 | 1.215 | 1.025 | 0.025 | 1.025 | 0.025 |
| $(\rho_s-\rho_f)$ gms./cc | 0.10 | 0.10 | 0.10 | 0.10 | 0.10 | 0.109 | 0.13 | 0.146 | 0.336 | 0.336 | 0.336 | 0.336 |
| Flow, ml./min | 95 | 95 | 95 | 95 | 95 | 107 | 100 | 185 | 220 | 220 | 220 |
| N$_0$, ft./sec | 0.0182 | 0.0182 | 0.0182 | 0.0182 | 0.0182 | 0.0182 | 0.0206 | 0.0192 | 0.0355 | 0.0423 | 0.0423 | 0.0423 |
| Temperatures: | | | | | | | | | | | | |
| Av. Temp.-Cryst. Bed, °C | 38.34 | 40.10 | 37.72 | 37.72 | 37.43 | 24.65 | 35.59 | 46.64 | 46.12 | 27.48 | 32.56 | 40.86 |
| Av. Temp.-Saturator, °C | 44.23 | 45.07 | 42.48 | 42.84 | 43.21 | 31.76 | 39.26 | 48.74 | 46.36 | 29.73 | 34.56 | 42.14 |
| Supersaturation: | | | | | | | | | | | | |
| Supersaturation °C | 5.89 | 4.97 | 4.76 | 5.12 | 5.78 | 7.11 | 3.67 | 2.10 | 0.24 | 2.25 | 2.00 | 1.28 |
| Supersaturation #/Ft.$^3$ solution | 1.07 | 0.973 | 0.79 | 0.865 | 0.975 | 0.57 | 0.48 | 0.46 | 0.051 | 0.192 | 0.236 | 0.249 |
| K, ft./hr | 0.0064 | 0.015 | 0.0128 | 0.014 | 0.0126 | 0.0035 | 0.0090 | 0.035 | 0.084 | 0.0063 | 0.010 | 0.0375 |

(1) = 10-20 mesh adipic acid from air and nitric acid oxidation of cyclohexane.
E = Voidage; fraction voids in a fluid, solid mixture.
$a$ = No. of sq. ft. of crystal area per cu. ft. of bed total.
A = Total crystal surface area.
DBA = Dibasic acid.
MBA = Monobasic acid.
$\rho_s$ = Density of solid.
$\rho_f$ = Density of fluid.
N$_0$ = Superficial velocity of solution through bed, ft./sec.
K = Linear growth rate.

where $\frac{dw}{d\theta}$ = growth rate (pounds or grams/hour)

K = crystallization linear growth rate constant (ft./hr)
A = crystal surface area (ft.$^2$)
S = supersaturation (lbs./ft.$^3$ solution)

A comparison of K in Examples 1 through 5 in Table II illustrates that dibasic by-product acids decrease crystallization rate as well as nucleation rate and that in the presence of 8 to 12% dibasic acids other than adipic acid, the monobasic acids in less than 1.25% have no effect on rate. To compensate for the decreased crystallization rate imposed by the addition of by-product dibasic acids while maintaining their stabilizing effect, increased crystallization temperatures were used. A comparison of K in Examples 4 through 12 will show the improved operation of a crystallization unit when operated under optimum temperature and supersaturation conditions. Between 6 and 7 there is a 2.5-fold increase, between 6 and 8 a 10-fold improvement and between 10 and 12 a 6-fold improvement in the crystal growth rate.

The organic acids used to suppress nucleation of adipic acid during its crystallization include those organic acids

We claim:

1. In a process for crystallizing adipic acid the steps which comprise preparing an aqueous solution containing adipic and nitric acids, saturating the solution, cooling said solution 2° C. to 5° C. below its saturation temperature, crystallizing the adipic acid, suppressing the rate of nucleation with at least 0.1% by weight of an organic monobasic acid containing 2 to 8 carbon atoms, and increasing the rate of crystal growth by conducting the crystallization at temperatures between about 40° C. and about 70° C.

2. The process of claim 1 conducted in the presence of at least 1% of an organic dibasic acid other than adipic acid, containing 2 to 8 carbon atoms.

3. In a process for crystallizing adipic acid, the steps which comprise cooling an adipic acid-nitric acid containing aqueous solution, that is saturated with adipic acid, to 2° C. to 5° C. below its saturation temperature, to effect supersaturation, crystallizing adipic acid from the supersaturated solution and suppressing the rate of nucleation by an organic monobasic acid containing 2 to 8 carbon atoms present to the extent of at least 2% of the total nitric acid in solution, the crystallization of the adipic acid from the aqueous nitric acid supersaturated solution being conducted at a temperature between about 40° C. and about 70° C.

4. The process of claim 3 in which the rate of nucleation is also suppressed by an organic dibasic acid other than adipic acid, containing 2 to 8 carbon atoms, present to the extent of at least 20% of the total nitric acid in solution.

5. In a process for crystallizing adipic acid from a saturated crude reaction mixture thereof obtained by air oxidation followed by nitric acid oxidation of cyclic hydrocarbons, the steps which comprise cooling the saturated crude reaction mixture 2° C. to 5° C. below its saturation temperature, crystallizing the adipic acid, suppressing the rate of nucleation by by-product organic monobasic acids present to the extent of at least 0.5% and increasing the rate of crystal growth by conducting the crystallization at temperatures between about 40° C. and about 70° C.

6. The process of claim 5 in which the nucleation is suppressed by by-product organic dibasic acids present to the extent of at least 8%.

7. The process of claim 5 in which the nucleation is suppressed by recycling a portion of the mother liquor from the crystallization zone to the nitric acid oxidation to maintain a by-product mono- and disbasic acid concentration between 8% and 18%.

8. In a circulatory process for the crystallization of adipic acid from a crude reaction mixture obtained by air and subsequent nitric acid oxidation of cyclic hydrocarbons in which by-product acids are formed, and wherein adipic acid supersaturation is continuously produced in a circulatory stream, the supersaturation being developed in one zone and released by crystallization in another zone while at the same time a mother liquor from the crystallization zone is returned to the supersaturation zone after the addition of the crude reaction mixture from the air and nitric acid oxidation, the steps which comprise recycling such a portion of the mother liquor as to maintain the nitric acid concentration between 25 and 45% and to increase the by-product acid concentration to between 8 and 18%, supercooling such a solution to 2° C. to 5° C. below saturation temperature and crystallizing the adipic acid therefrom at a temperature between 40 and 70° C.

9. In a continuous process for the crystallization of adipic acid from a crude reaction mixture obtained by cyclohexane oxidation by air and subsequent nitric acid oxidation of the resulting oxygenated product, wherein adipic acid is continuously crystallized from a 25–45% by weight nitric acid solution, and the crude adipic acid separated from the mother liquor by filtration, the steps which comprise recycling a portion of the mother liquor to the nitric acid oxidizers to maintain the by-product dibasic acid concentration of 8–18% by weight, on an adipic acid free basis, in the crystallization environment, controlling the rate of heat removal in the crystallization step to maintain a temperature between 40° and 70° C., and controlling the relative crystallizer feed rate to crystallizer volume so as to maintain the crystallization environment no more than 5° C. below its saturation temperature.

References Cited in the file of this patent

UNITED STATES PATENTS 2,285,601     McAllister               June 9, 1942

OTHER REFERENCES

Svanoe: J. Chem. Ed., pp. 549–53, October 1950.